United States Patent
Turányi

(10) Patent No.: US 8,488,559 B2
(45) Date of Patent: Jul. 16, 2013

(54) METHOD AND AN APPARATUS FOR PROVIDING ROUTE OPTIMISATION

(75) Inventor: Zoltán Richárd Turányi, Szentendre (HU)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 350 days.

(21) Appl. No.: 12/865,820

(22) PCT Filed: Aug. 20, 2008

(86) PCT No.: PCT/EP2008/060881
§ 371 (c)(1), (2), (4) Date: Aug. 31, 2010

(87) PCT Pub. No.: WO2009/097914
PCT Pub. Date: Aug. 13, 2009

(65) Prior Publication Data
US 2010/0315992 A1    Dec. 16, 2010

(30) Foreign Application Priority Data
Feb. 4, 2008  (WO) ............... PCT/SE2008/050137

(51) Int. Cl.
*H04W 4/00* (2009.01)
*H04W 80/04* (2009.01)

(52) U.S. Cl.
CPC .................................. *H04W 80/04* (2013.01)
USPC ........................................... 370/331; 370/238

(58) Field of Classification Search
USPC ... 370/229–238, 252, 310–350; 709/238–242
See application file for complete search history.

(56) References Cited

U.S. PATENT DOCUMENTS

| | | | |
|---|---|---|---|
| 7,965,695 B2 * | 6/2011 | Valko et al. .................... | 370/338 |
| 2006/0256749 A1 * | 11/2006 | Rexhepi et al. ............... | 370/329 |
| 2007/0195791 A1 | 8/2007 | Bosch et al. | |
| 2008/0089292 A1 * | 4/2008 | Kitazoe et al. ............... | 370/331 |
| 2010/0265912 A1 * | 10/2010 | Mildh et al. .................. | 370/331 |

OTHER PUBLICATIONS

Liebsch M et al: "Route Optimization for 1-26 Proxy Mobile IPv6; draft-abeille-netlmm-proxym ip6ro-01.txt" Internet Engineering Task Force (IETF), Nov. 13, 2007, XP015052533.
Dutta A et al: "ProxyMIP Extension for 1-26 inter-MAG Route Optimization; draft-dutta-netimm-pmipro-01.txt" Internet Engineering Task Force (IETF): Jul. 13, 2008, XP015057596.

\* cited by examiner

*Primary Examiner* — Kan Yuen

(57) ABSTRACT

A mechanism for initiating route optimization in an administrative domain. The mechanism is actualized when traffic is exchanged between at least a first mobile node and a second mobile node, said traffic taking place over at least one Local Mobility Anchor (LMA) within said administrative domain. The traffic exchange between said first and second mobile nodes within the administrative domain is detected followed by a decision to initiate route optimisation for the traffic. Thereafter an optimized route for the traffic, in which the traffic is routed directly between a first and a second mobile access gateway (MAG) serving the first and the second mobile nodes, respectively, is created. A route optimisation update is then sent directly or indirectly, to any uninformed mobile access gateway (MAG), after which the traffic is routed directly between the first and the second MAG. This method for route optimization may be applied in a Proxy Mobile IP (PMIP) context.

25 Claims, 14 Drawing Sheets

```
Entry 1:    IP address MN1
            IP address MN2
            .
            .
            Lifetime: 2008-01-10; 22:47       ⎫
            Seq. No: 2                        ⎬ 121
Entry 2:    IP address MN1                    ⎭
            IP address MN7
            .
            .
            Lifetime: 2008-01-10; 23:15
            Seq. No: 1
```

Figure 2a

```
Entry 1:    IP address MN1
            IP address MN2
            .
            IP address MAG2
            .
            Lifetime: 2008-01-10; 22:47       ⎫
            Seq. No: 2                        ⎬ 126
Entry 2:    IP address MN1                    ⎭
            IP address MN7
            .
            .
            IP address MAG7
            .
            .
            Lifetime: 2008-01-10; 23:15
            Seq. No: 1
```

Figure 2b

METHOD AND AN APPARATUS FOR PROVIDING ROUTE OPTIMISATION

TECHNICAL FIELD

The present invention relates to a method and an apparatus for achieving route optimisation in a telecommunication network.

Background

The 3GPP group has specified a protocol known as the GPRS Tunneling Protocol (GTP) in TS 29.060 Release 7. GTP is intended to provide a mechanism for the mobility management of packet data traffic associated with mobile terminals. More particularly, GTP is implemented between an IP anchor point implemented at the GPRS Gateway Support Node (GGSN) and an IP access point implemented at a Serving Gateway Support Node (SGSN), where both the GGSN and the SGSN are nodes within the GPRS core network. A primary role of the anchor point is the allocation of IP addresses to mobile terminals (from a fixed pool of addresses). An IP address is allocated to a mobile terminal for the duration of a session. The access point is responsible for registering the current location of a mobile terminal with an anchor node to allow the anchor node to tunnel packets, addressed to an IP address allocated to a mobile terminal, to the mobile terminal.

A parallel mobility protocol known as Proxy Mobile IP (PMIP) has been specified by the IETF (IETF draft-ietf-netlmmproxymip6-06.txt) in order to allow GTP like functionality to be introduced to other packet data networks, e.g. CDMA2000-based networks. PMIP refers to the anchor point as a "Local Mobility Anchor" (LMA) and to the access point as a "Mobility Access Gateway" (MAG). According to PMIP, Mobile Nodes (MNs) attach to a network in an administrative domain via Mobility Access Gateways (MAG). Each MN is then assigned a Local Mobility Anchor (LMA) that assigns an IP address to the terminal. The MAG sends a Proxy Binding Update (PBU) message to the LMA to register the current location of the MN. The location is represented by the IP address of the MAG currently serving the MN. The LMA responds with a Proxy Binding Acknowledgement (PBA) message containing the assigned IP address. After registration the LMA intercepts all downlink packets addressed to the MN and tunnels them to the MAG, which, in turn, decapsulates them and delivers them to the MN. Uplink packets of the MN are encapsulated by the MAG, tunnelled to the LMA, where they are de-capsulated and routed further based on the destination address of the packet. Thus, all packets or traffic will go through the LMA which puts a big load on the LMA at the same time as the traffic will be exchanged through a longer path than the optimized route, especially when the mobile node and a correspondent node are in topologically close location in a large administrative domain where the LMA may be far away from the mobile node.

When a MN moves to a new MAG, the new MAG sends an update of location to the LMA in the form of a PBU message. The LMA acknowledges the receipt of the message by sending a PBA and redirects the tunnel to the new MAG. Note that IP address assignment is performed only once.

A lot of problems remain to be solved concerning route optimisation within Proxy Mobile IPv6 compared with Mobile IPv6, see e.g. "Problem Statement and Requirements for Route Optimisation in PMIPv6, draft-jeong-netlmm-pmipv6roreq-01.txt, S. Jeong et al." For instance it is not possible for the mobile node to perform correspondent binding update; the mobile node cannot perform binding registration to a correspondent node, and intermediate nodes in the network should do route optimisation procedures on behalf of the mobile node; and in PMIPv6 a correspondent node cannot establish a trust relationship with a mobile node because the reachability test is not applicable.

An attempt to provide route optimisation and to reduce the traffic passing through the LMA is disclosed in US-A 1-2007/0253371. This document describes a system and a method for route optimisation in the specific case that two sessions pass through the same access node (MAG). Then, instead of sending them up to the anchor node (LMA), which would turn the traffic down anyway, they switch it already at the access node. This works only if both sessions pass through the same access node, that is, if both mobile nodes are being served by the same access node.

SUMMARY

According to a first aspect of the present invention there is provided a method of handling route optimisation in a communication network for traffic being exchanged between first and second mobile nodes, each of the first and second mobile nodes being attached to an access point and the or each access point being attached to an anchor point. The method comprises, at the or each anchor point, initially handling a flow of traffic through the anchor point between said first and second mobile nodes. Route optimisation is then initiated for the traffic including sending a route optimisation update from the or each anchor point to the attached access point(s). Upon receipt of the route optimisation update at the or each access point, that update is acted upon to establish an optimised traffic route whereby the traffic does not flow up to the anchor point(s).

Embodiments of the present invention may provide a method and an apparatus for route optimisation that is applicable to all situations occurring when two mobile nodes are roaming in the same domain and exchange traffic between them. Route optimisation may be totally transparent to the mobile nodes and is entirely network centric.

According to a further aspect of the present invention there is provided a method for initiating route optimisation in an administrative domain is disclosed. The method is actualized when traffic is exchanged between at least a first mobile node and a second mobile node, said traffic taking place over at least one Local Mobility Anchor (LMA) within said administrative domain. The method comprising the steps of: detecting the traffic exchange between said first and second mobile nodes within the administrative domain followed by a decision to initiate route optimisation for the traffic. Thereafter an optimized route for the traffic, in which the traffic is routed directly between a first and a second mobile access gateway (MAG) serving the first and the second mobile nodes, respectively, is created. A route optimisation update is then sent directly or indirectly, to any uninformed mobile access gateway (MAG), after which the traffic is routed directly between the first and the second MAG.

An advantage is thereby that route optimisation is enabled between the mobile nodes such that they communicate through a path that is shorter (in terms of hop count) than the path chosen by base Proxy Mobile IPv6. This results in a reduction in packet propagation delays, in less bandwidth consumption and in less congestion at the local mobility anchor.

According to a preferred embodiment the above mentioned steps are performed in the LMA. An advantage is thereby that extra configuration in the MAGs are minimized.

According to an embodiment of the invention the step of observing the traffic exchange includes the steps of observing the packets that are being processed by the LMA and if a packet arrives to the LMA in a tunnel from a first MAG and is routed in a tunnel to a second MAG, it is concluded that traffic exchange is taking place within the administrative domain and between mobile nodes served by the MAGs.

According to another embodiment of the invention the step of observing the traffic exchange includes the steps of observing the IP addresses of packets that are being processed by the LMA and if both the source and the destination IP addresses for a packet belong to mobile nodes served by the LMA, it is concluded that traffic exchange is taking place between mobile nodes within the administrative domain.

According to further embodiment of the invention the traffic exchange is observed by receiving an indication from a MAG that detects the traffic exchange.

According to an alternative embodiment of the invention the steps of observing traffic exchange between the mobile nodes and deciding to initiate route optimisation for the traffic is performed by a MAG which notifies the serving LMA of its decision. Thereafter an optimized route for the traffic is created in the LMA, in which optimized route the traffic is routed directly between said MAGs and a route optimisation update is sent to said MAGs.

An advantage is thereby that the detection and decision can be performed in an MAG instead of in the LMA, diminishing the work of the LMA.

According to an embodiment of the invention the decision to initiate route optimisation is based on policy settings.

In accordance with an embodiment of the invention the route optimisation can be performed even if the traffic is taking place over two LMAs within the domain. The method then includes the steps of sending the route optimisation update from the LMA that initiated route optimisation (or served the MAG that initiated route optimisation) to the second LMA involved in the traffic exchange and thereafter forwarding the route optimisation update from the second LMA to any uninformed MAG.

According to a further aspect of the present invention, an LMA node for achieving route optimisation is also disclosed. The node includes a detector for detecting, or a receiver for receiving an indication, if both the first and the second mobile node are located within the administrative domain. Further the node includes decision means for making a decision to initiate route optimisation for said traffic; means for creating an optimized route for the traffic, in which the traffic is routed directly between a first and a second mobile access gateway (MAG) serving the first and the second mobile nodes, respectively; and a transmitter for sending information of the optimized route to said first and second MAGs.

By using an LMA node according to the invention, route optimisation that is transparent to the mobile nodes can be initiated in a simple fashion, resulting in a reduction in packet propagation delays, in less bandwidth consumption and in less congestion at the local mobility anchor.

According to an alternative embodiment of the invention a Mobile Access Gateway (MAG) node located in an administrative domain is also disclosed. The MAG node includes a detector for detecting if traffic is routed between two mobile nodes located within the same administrative domain. The node also includes decision means for making a decision to initiate route optimisation for said traffic, a transmitter for sending information about the decision to a local mobility anchor (LMA); and a router for routing the traffic directly between said MAG and a second MAG serving the second mobile node.

An advantage is thereby that route optimisation is performed and that the detection and decision can be performed in an MAG instead of in the LMA, diminishing the work of the LMA.

According to a still further aspect of the present invention there is provided an anchor point node for use in a communication network in which traffic is to be exchanged between first and second mobile nodes, each of the first and second mobile nodes being attached to an access point and the or each access point being attached to the anchor point node. The anchor point node comprises a traffic handler for initially handling a flow of traffic through the anchor point between said first and second mobile nodes, and a route optimiser for initiating route optimisation for the traffic including sending a route optimisation update from the or each anchor point to the attached access point(s)

According to a still further aspect of the present invention there is provided an access point node for use in a communication network in which traffic is to be exchanged between first and second mobile nodes at least one of which is attached to the access point node, and the access point node is attached to an anchor point node. The access point node comprises a receiver for receiving a route optimisation update from said anchor point node, and a route optimiser for acting on that update to establish an optimised traffic route whereby the traffic does not flow up to the anchor point(s).

BRIEF DESCRIPTION OF THE DRAWINGS

FIG. 2a illustrates an example of a route optimisation table in a local mobility anchor;

FIG. 2b illustrates an example of a route optimisation table in a mobility access gateway;

DETAILED DESCRIPTION

An improved approach to route optimisation in a communications network will now be described, first within the context of simple network architecture involving a single anchor point (or anchor point layer) with connected access points and later within the context of a hierarchical network architecture involving multiple anchor point layers and multiple access point layers.

Figure 1:
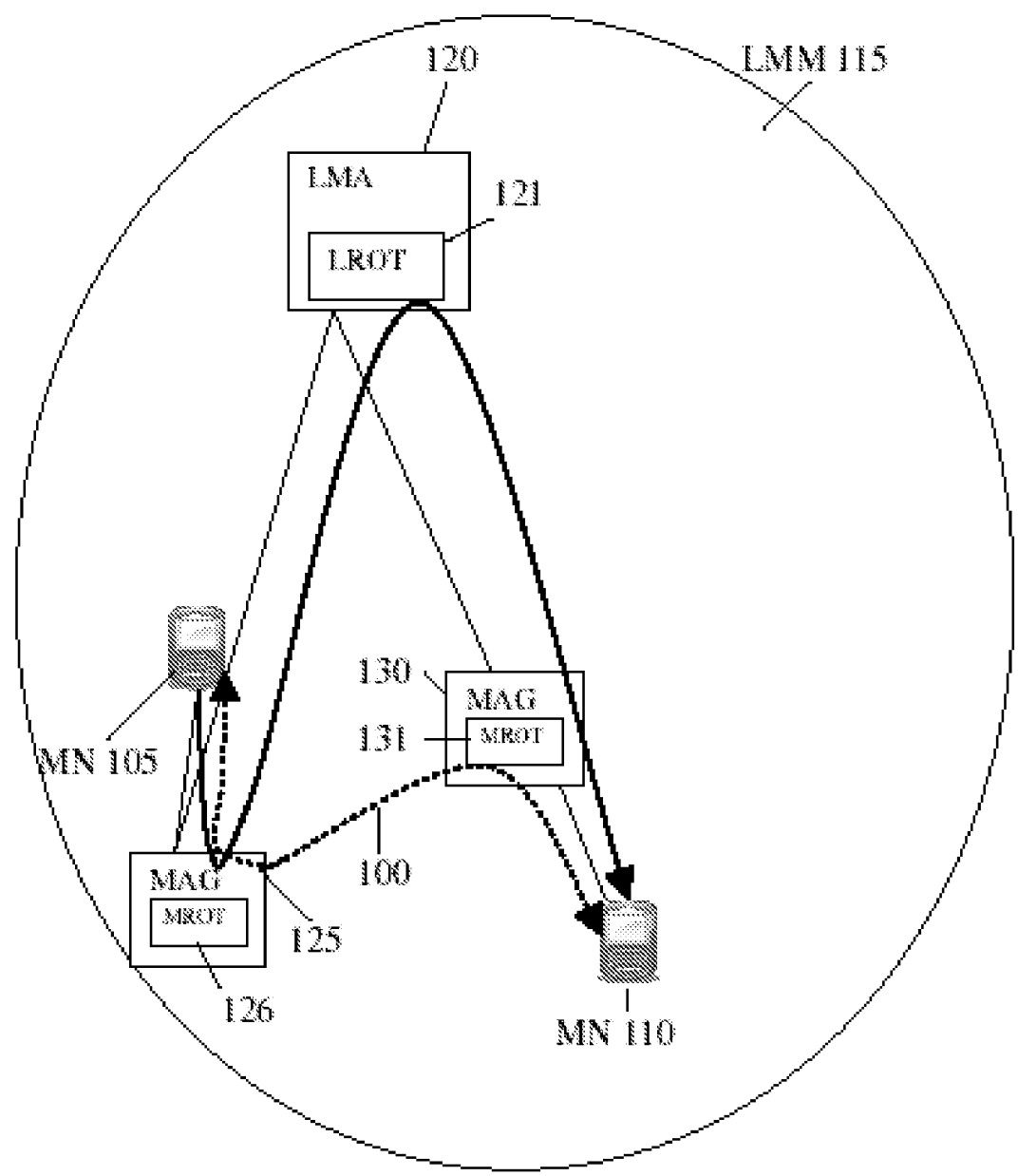
FIG. 1 illustrates a schematic diagram of a method for route optimisation according to a first embodiment of the present invention.
Figure 2:
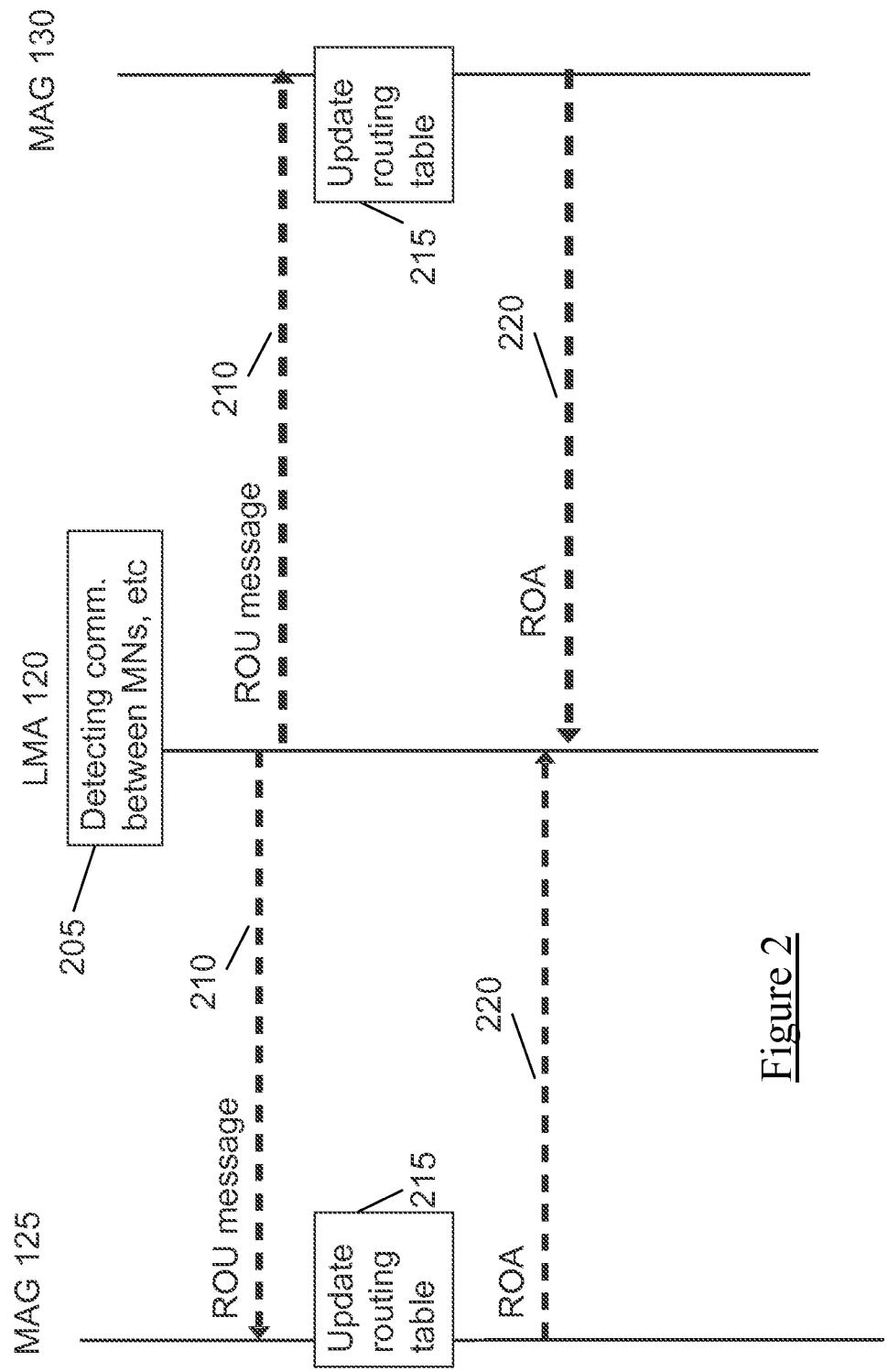
FIG. 2 illustrates a schematic diagram for signaling between nodes according to a first embodiment of the present invention.

FIG. 1 shows an overview of a method for route optimisation 100 between a first mobile node (MN) 105 and a second MN 110 according to a first embodiment of the invention. A mobile node is preferably an IPv6 host and can be a mobile phone, a personal digital assistant (PDA), a wirelessly enabled laptop, etc. or any similar device or user equipment. The MNs 105, 110 are roaming in the same administrative domain 115 and have the same LMA 120 serving them. The administrative domain can also be called a local mobility management (LMM) and is preferably a PMIP domain. If the first MN 105 exchanges traffic with the second MN 110, packets are sent to a first MAG 125 serving the MN 105 and then automatically tunnelled to an LMA 120 and then tunnelled down to a second MAG 130 of the destination MN 110. This will result in a longer route (and hence higher overhead) than if the two MAGs directly exchanged the traffic via the route optimisation path 100, thereby reducing the load on the network between the LMA and the MAGs. A method for initiating route optimisation according to a first embodiment of the present invention will therefore be described with reference to FIG. 2 showing a schematic diagram for signaling between nodes.

According to this embodiment the initiation of the route optimisation is done by the LMA. In particular, the LMA comprises a traffic handler for initially handling a flow of traffic through the anchor point between said first and second mobile nodes, and a route optimiser for initiating route optimisation for the traffic including sending a route optimisation update from the or each anchor point to the attached access point(s). Referring to FIG. 2, first, in block 205, the traffic handler within the LMA detects that two of its MNs communicate with each other. This can be done in two different ways. One way is to let the LMA 120 observe the packets it processes. If a packet arrives at the LMA in a tunnel from an MAG and needs to be routed into a tunnel to another MAG, then this packet is involved in traffic exchange between two MNs served by this LMA. Traffic can be defined as the sending of packets between different nodes. Another method of detecting communication or traffic exchange between MNs within an LMM is to look at the IP addresses of the packets arriving at the LMA. If both the source and destination IP addresses of a packet belong to an MN served by this LMA, there is a match, i.e. traffic exchange is present. The traffic exchange detection need not necessarily be performed by the LMA. The method of detecting communication by observing IP addresses can also be performed in e.g. the MAG whereupon an indication that MNs within the LMA communicate with each other is sent from the MAG to the LMA. In any case the LMA observes the traffic exchange in this embodiment, irrespective of where the detection takes place.

After it is established that traffic exchange occurs between the MNs, the LMA (still in block 205) makes a decision of initiating route optimisation. The LMA then adds an entry to an LMA Route Optimisation Table (LROT) or similar, the table containing the IP addresses of the MN pairs, for which route optimisation has been initiated. An LROT entry preferably also contains a sequence number and a lifetime field; these will be further explained below. The LMA sends a new Route Optimisation Update (ROU) message 210 to the two MAGs. The ROU message contains:

a. The MAGs own MN IP address, i.e. the IP address of the MN served by the MAG the message is sent to (this informs the MAG, which of its MNs the route optimisation is set up for);

b. The IP address of the other MN involved in the traffic (this informs the MAG of which MN that is the peer MN (also called second node or correspondent node) for which route optimisation is set up);

c. The IP address of the other MAG involved in the traffic, i.e. the IP address of the MAG serving the peer MN mentioned in b above (this informs the MAG about which destination the packets sent by the MN that is served by the MAG are to be routed);

Preferably the ROU message 210 also contains:

d. A sequence number which is a number that is incremented each time one of the MNs change MAG (this helps avoid problems where frequent handovers occur, and route optimisation messages are not delivered correctly); and e. Lifetime: the expiry time of the route optimisation; this informs the MAG to remove the entry in its route optimisation table (further explained below) after its lifetime has expired. Note that the lifetime also applies to the LROT entry, this will be further explained when methods to maintain route optimisation is described.

Each MAG includes a receiver for receiving a ROU from said LMA, and a route optimiser for acting on that update to establish an optimised traffic route whereby the traffic does not flow up to the LMA. More particularly, the MAGs update their routing tables in accordance with the ROU message from the LMA as depicted by reference 210. The MAGs install the received data in MAG Route Optimisation Tables (MROT) and add appropriate routing entries to set up the direct MAG-to-MAG tunnel for the traffic between the two MNs mentioned in the ROU message as shown in block 215. An MROT entry contains the IP address of the two MNs, the IP address(es) of the other MAG(s), and preferably also a sequence number and a lifetime field. The MAGs acknowledge the receipt of the ROU by sending a Route Optimisation Acknowledgement (ROA) message 220 to the LMA. After this initiation procedure the packets will be routed directly between the first MAG 125 and a second MAG 130 as in the route optimisation path 100 in FIG. 1, instead of via the LMA. The new routing path will according to this embodiment be MN 105-MAG 125-MAG 130-MN 110.

Note that the MAGs can individually reject route optimisation (either in general or for a particular MN served by them or for a particular MN-MN pair). This can be done by using an appropriate result code in the ROA message, merely informing the LMA that route optimisation will not be performed. In this case the LMA then sends a new ROU message to the other MAG cancelling the recently established route optimisation there as well. This can be done by setting the lifetime field or the field of the other MAG to zero. This will cause the removal of the entry from the MAGs MROT. After that the LMA removes the corresponding entry from the LROT.

Note also that route optimisation preferably is bi-directional. That is, it is always configured in both MAGs and if one of the MAGs rejects it, then it is removed from the other MAG, too.

FIG. 2a illustrates an example of a route optimisation table in a local mobility anchor, i.e. an LROT. The table 121 includes one entry for each route optimized session taking place below the LMA 120. The first entry, Entry 1, includes the IP addresses for the mobile nodes involved in the session, the expiry time for the session and the sequence number. As can be seen from the table this entry concerns a session involving two mobile nodes; MN1 and MN2, has an expiry time set to be 22:47, Jan. 10, 2008. Furthermore handover has been performed once, i.e. one of the mobile nodes has changed MAG once, since the sequence number is set to 2. The lifetime must not be set to a specific date or time, but can of course also be in the form of a countdown, etc. The second entry, Entry 2, also includes the IP addresses for the mobile nodes involved in the session, the expiry time for the session and the sequence number.

As can be seen from the table this entry concerns a session involving two mobile nodes; MN1 and MN9, has an expiry time set to be 23:15, Jan. 10, 2008. No handover has been performed since the sequence number is set to 1.

FIG. 2b illustrates an example of a route optimisation table in a mobility access gateway, i.e. an MROT. The table 126 includes one entry for each route optimized session taking place involving the MAG 125. The entries in FIG. 2b relate to the same sessions as illustrated in FIG. 2a. The first entry, Entry 1, includes the IP addresses for the mobile nodes involved in the particular session, the expiry time for the session and the sequence number as in the table in FIG. 2a. Furthermore, this table includes the IP address of the MAG serving the other mobile node, i.e. the mobile node involved in the session not being served by the MAG 125. In this case it is MAG2 that serves MN2. Accordingly, Entry 2 illustrates the IP address of the MAG serving the mobile node MN7 not served by MAG 125.

Figure 3:
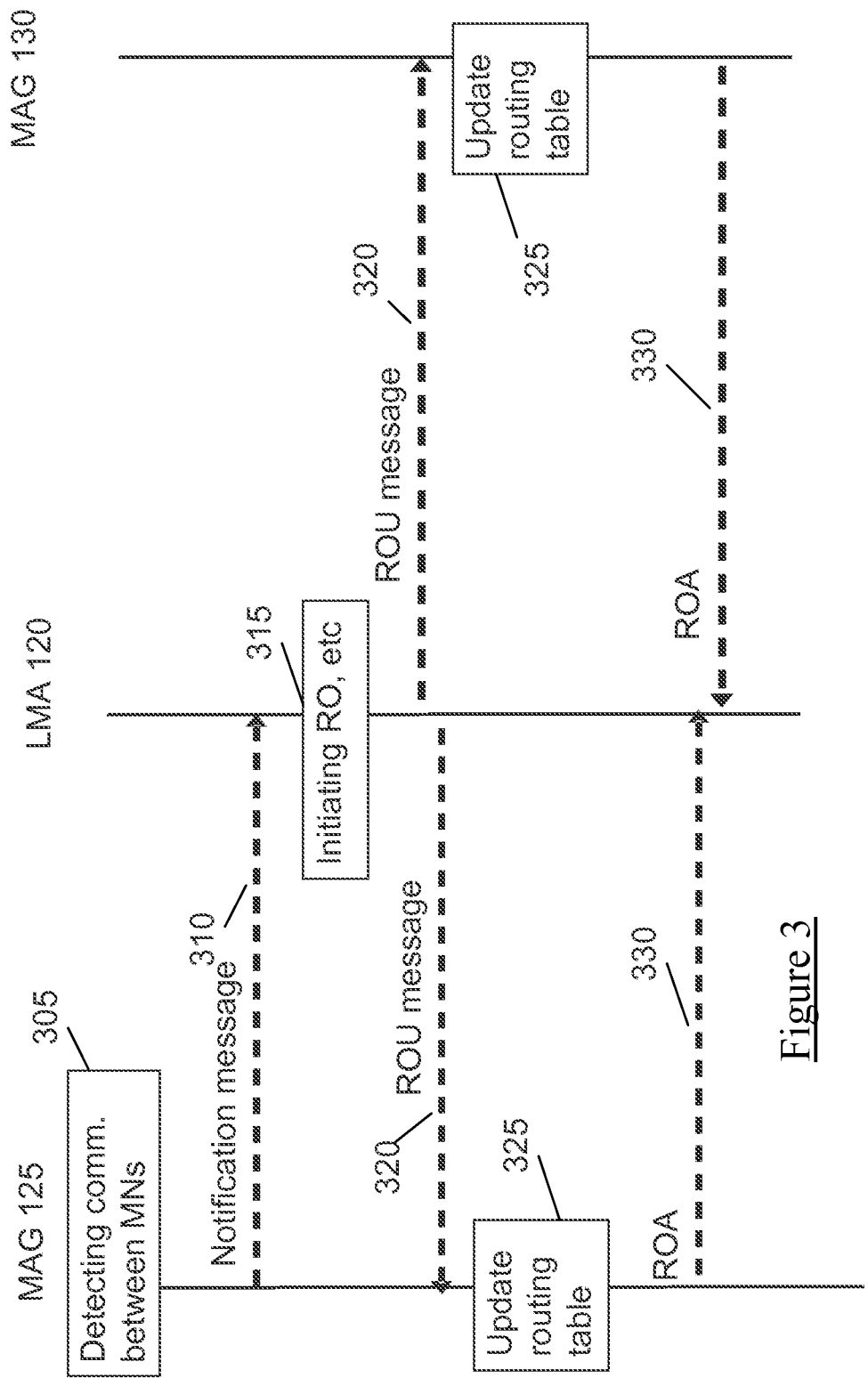
FIG. 3 illustrates schematically a diagram for signaling between nodes according to a second embodiment of the present invention.

An alternative method for initiating route optimisation according to a second embodiment of the present invention will in the following be described with reference to FIG. 3. First, in block 305, one of the MAGs (MAG 125) detects that two MNs within the LMM communicate with each other. In order for the MAG to detect this, the MAG needs the IP address ranges served by the LMA serving the MAG (or all LMAs within the LMM, see the third embodiment below) so that it can check if the IP addresses of the source and destination of a packet belongs to the IP address range of the same LMA. Thereafter the MAG can send a notification message 310 to the LMA after which the LMA can continue with block 315. In block 315 the LMA makes a decision to initiate route optimisation. The LMA then adds an entry to the LROT as described above with reference to the first embodiment. The decision to initiate route optimisation could also be performed by the MAG that detects the traffic exchange after which the MAG would notify the LMA of its decision, preferably at the same time as the notification of the detection. Then the LMA sends a new Route Optimisation Update (ROU) message 320 to the two MAGs involved in the traffic exchange. Thereafter the MAGs update their routing tables (block 325) and send a ROA message 330 to the LMA in the same way as in blocks 215 and 220.

Figure 4:
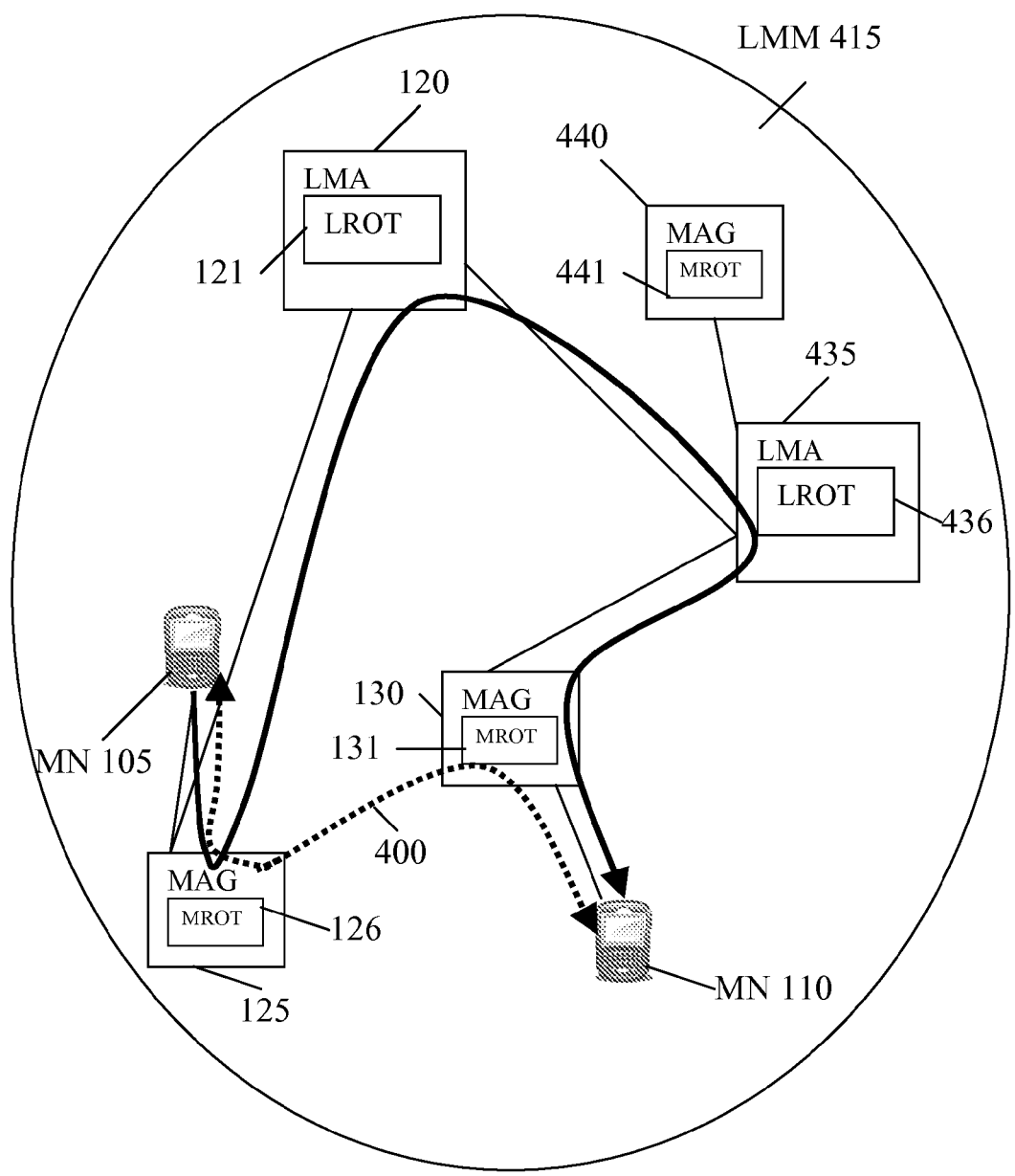
FIG. 4 illustrates a schematic diagram of a method for route optimisation according to a third embodiment of the present invention.
Figure 5:
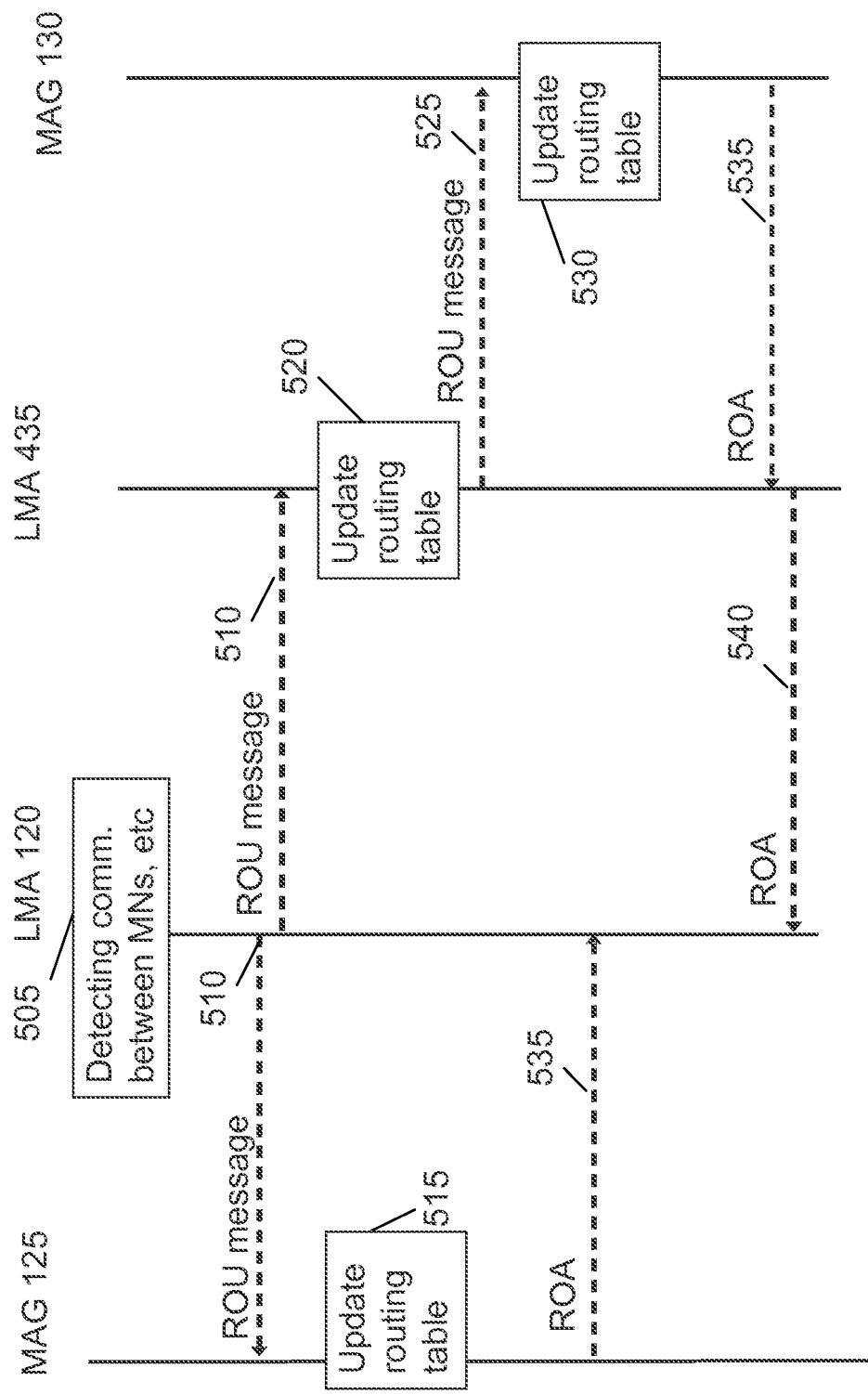
FIG. 5 illustrates schematically a diagram for signaling between nodes according to a third embodiment of the present invention.

A third embodiment of the present invention will now be illustrated with reference to FIGS. 4 and 5. For convenient reasons the devices and features that are the same in FIGS. 1 and 4 will use the same reference numbers as in FIG. 1. This embodiment can be extended to the case when two separate LMAs serve the two MNs. This can happen in a large domain where multiple LMA nodes are employed for load balancing, reliability or topology considerations. Note that we still assume that the two LMAs and MAGs fall under the same administration. This is required for MAGs to trust other MAGs with direct communication, e.g., it is difficult to have a firewall to accept direct traffic exchange between MAGs located in different domains. Also, LMAs of one operator may not trust signaling information received from LMAs of another operator. Nevertheless this is a soft requirement, so if e.g., operators do not require firewalls or the trust otherwise exists or is secured, the approach would be applicable to the inter-operator case.

In the present case, each LMA shall be configured with the address of all other LMAs together with the IP address range of those LMAs, i.e. the IP address ranges from which LMAs assign IP addresses to the MNs. Initiation of route optimisation can then be performed in one of the LMAs, which can detect MN-to-MN communication by detecting IP addresses from the aforementioned IP address ranges. The LMA can also deduct from configuration the IP address of the other LMA. Route optimisation can then be initiated in the same way as described in previous embodiments, with the exception of sending the ROU message to the MAG serving its own MN and to the LMA of the other MN. Both the detection of the traffic exchange within the domain as well as the decision to initiate route optimisation can be performed by a MAG even in this embodiment. However, then the MAG must be configured as the LMAs above and the ROU message must be sent to the MAG's LMA for further distribution to other LMAs and MAGs. In the description of this third embodiment we will however focus on the LMA doing the detection and the initiation decision.

First one of the LMAs (LMA 120) detects MN-to-MN traffic and decides to initiate route optimisation as denoted in block 505. The LMA 120 updates its routing table by adding an entry to its LROT and sends an ROU message 510 to the MAG 125 served by the LMA 120 and serving one of the MNs involved in the traffic exchange. This is exactly the same as in the first embodiment when the MAGs are located below the same LMA 120. The MAG acts exactly as in that case and updates its routing table by adding an entry to its MROT as shown in block 515. The LMA 120 also sends an ROU message 510 to the LMA 435 of the other MN involved in the traffic exchange. The IP address for LMA 435 can be obtained from configuration data based on the IP address of the other MN. In block 520 the LMA 435 installs an entry in its LROT, and then forwards the ROU message 525 to the MAG 130 served by the LMA 435 and serving the other MN involved in the traffic exchange. The MAG 130 acts the same way as in the previous embodiments and updates its routing table in block 530. After updating their routing tables the MAGs send a ROA message 535 to their respective LMA. An ROA message 540 from the LMA 435 to LMA 120 is also sent after ROA message 535 has been received by LMA 435. This message is to acknowledge the ROU message 510 and to report success/failure, as well. After this initiation procedure the packets will be routed directly between MAG 125 and MAG 130 as in the route optimisation path 400 in FIG. 4, instead of via LMA 120 and LMA 435. The new routing path will according to this embodiment be MN 105-MAG 125-MAG 130-MN 110.

Note that in this case not only MAGs, but another LMA has the ability to reject route optimisation, by sending an ROA back to the initiator LMA with information to reject route optimisation.

If both LMAs initiate route optimisation at the same time, they can easily detect the situation. In this case both of them should acknowledge the ROU message. Since the sequence number in the case of simultaneous RO initiation will be updated twice, the larger sequence number shall be used. If both MNs perform handover at the same time, they both need to increment the sequence number by one in addition to the increment they performed. In the present approach the term handover is interpreted as a mobility event that results in that the MN change MAG. Mobility events that happen below the same MAG and do not result in a change of MAGs will not affect route optimisation significantly and are not considered here.

A MN can perform hand over from a source MAG to a target MAG. In this case the target MAG will send a PBU to the LMA. The source MAG is either notified using means outside e.g. PMIP (e.g., L2 context transfer, the MN performing the hand over ($MN_H$) tearing down radio link, etc.) or is not notified at all. If route optimisation already is set up for $MN_H$ it is advantageous to 1) update the MAGs of correspondent MNs ($MN_{corr}$S) with the address of the target MAG now serving $MN_H$; and 2) establish the MROT in the target MAG so that the target MAG can also send packets directly to the MAGs of $MN_{corr}$S, for which route optimisation has been established while the $MN_H$ was at the source MAG, before hand over took place.

Figure 6:
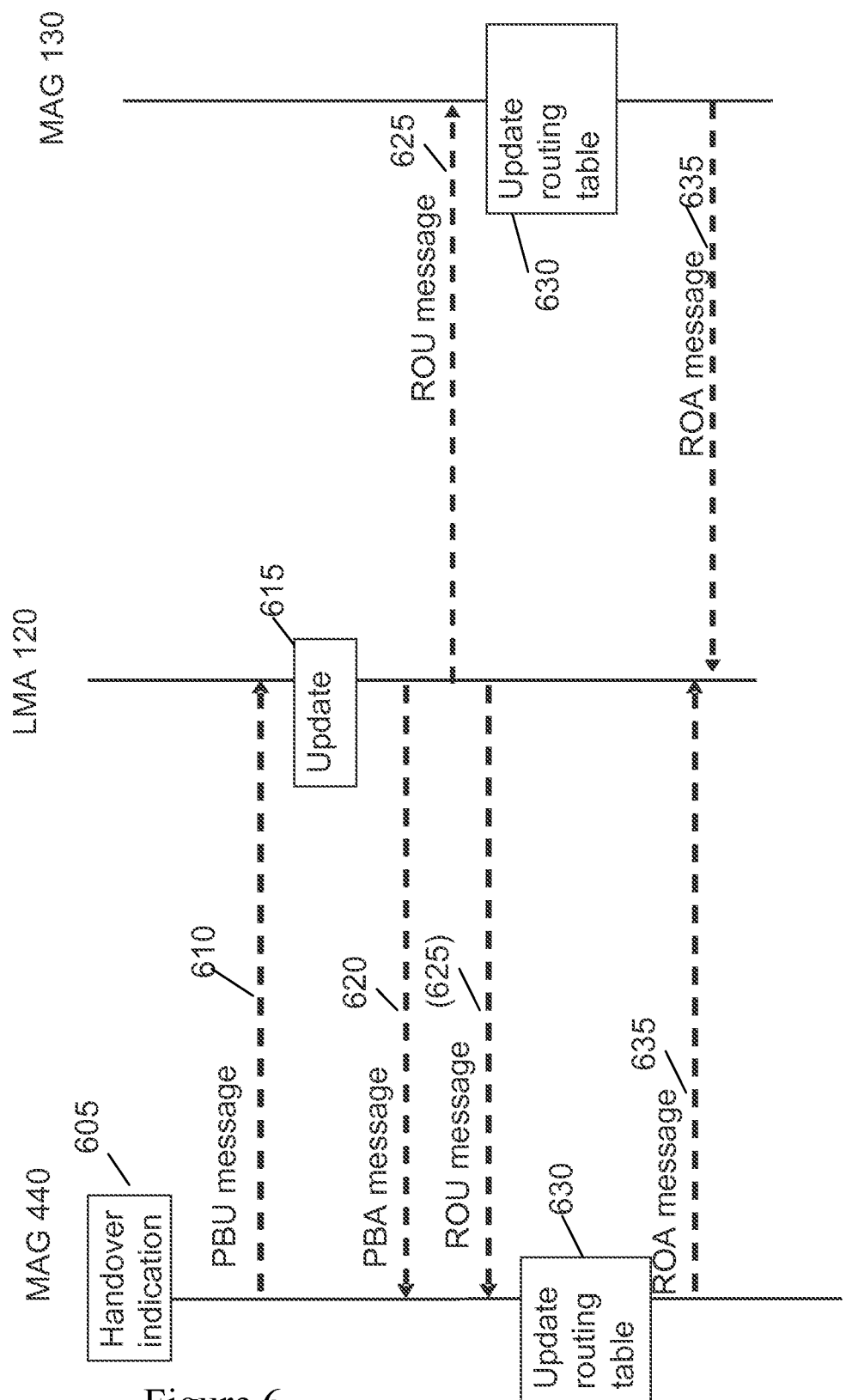
FIG. 6 illustrates schematically a diagram for signaling between nodes when handover takes place according to the present invention.

In the following the handover procedure will be described with reference to FIG. 6. Referring also to FIG. 4, the MN 105 performs in the described embodiment hand over from the MAG 125 to the MAG 440. First the target MAG 440, i.e. the MAG the $MN_H$ is attaching to after it has left the source MAG 125, detects or gets an indication in block 605 that handover has taken place. The target MAG 440 then sends a PBU message 610 to the LMA in order to register the current location of the $MN_H$. The LMA updates the location of $MN_H$ in its proxy binding cache according to e.g. PMIP in block 615. If there are no entries in the LROT with $MN_H$ as one of the communicating peers, the LMA simply responds with a PBA as dictated by PMIP and stops processing. If there are one or more entries in the LROT with $MN_H$ as one of the peers, the LMA includes all of these in a PBA message 620 to be sent to MAG 440 in a newly defined extension of the PBA message. The PBA message would then include, the IP address of the other MN and MAG involved in the route optimisation and preferably lifetime fields for each LROT entry containing $MN_H$. This will establish the MROT corresponding to $MN_H$ in the target MAG 440. As an alternative the LMA may send an unextended PBA followed by an additional ROU message 625 to the MAG 440. The LMA also sends an ROU message 625 for each entry in the LROT having $MN_H$, i.e. to all MAGs involved in traffic exchange with $MN_H$. These messages are sent to MAGs that serve $MN_{corr}$S, e.g. MAG 130 in FIG. 6. These messages update the MROTs (block 630) in those MAGs with the address of the target MAG 440, so they can redirect their tunnel from the source MAG to the target MAG. The MAGs reply with an ROA message 635. The target MAG and the MAG of $MN_{corr}$S start using the direct tunnel between each other as dictated by the MROTs, i.e. the routing path will be $MN_H$-MAG 440-MAG 130-$MN_{corr}$.

In case the MAGs are being served by different LMAs, the LMA for the MN performing handover ($MN_H$) takes the responsibility of sending ROU messages to the MAGs of the correspondents of $MN_H$ ($MN_{corr}$S). If some of the $MN_{corr}$S are served by a different LMA, then the ROU messages are addressed to that LMA, which, in turn forwards them to MAG currently serving the individual $MN_{corr}$.

In order to prevent never-ending sessions, route optimisation is preferably set to expire after a certain time has lapsed. This is realized by making the entries in the LROT and MROT time out. If the MNs continue exchanging traffic by the time the corresponding entries time out, there needs to be a mechanism to extend the lifetime of these entries. There are at least two ways to maintain the route optimisation. In a first solution the LMA refreshes the entry in the MAGs' MROT by periodically re-sending the ROU message to the MAGs before the lifetime of the previous update will expire. These messages could also be sent from one of the MAGs. The messages can be set to be sent a couple of seconds or minutes before the expiry, the time can be predefined independent of the type of session or varied depending on a lot of reasons e.g. which MNs that are involved in the session and the ports that are used. The LMA may e.g. collect several updates regarding various MNs and send them as a single message. If, however, either of the MAGs detects that the two MNs are no longer in communication, and if the entries do not need to be kept for any other reasons, it can reject such updates. This is preferably done in the same way as the establishment of route optimisation is rejected as described above. A second solution is to continuously or intermittently detect that there is ongoing traffic between the MNs. Then the MAG sends a newly defined Route Optimisation Refresh (ROR) message to an LMA informing it about the necessity of maintaining route optimisation before the time of expiry. The LMA updates the lifetime of the entry in the LROT and sends an ROU message to the other MAG(s) refreshing the MROT there. The ROR message should preferably be sent a random time before expiry to avoid both MAGs sending such a message.

Route optimisation needs to be removed if one of the MNs detach from the network, i.e. if one MN involved in the traffic exchange moves to another domain. Another reason could be a change of policy. A third reason could be that one of the MNs has moved to an MAG that does not support or does not want to support route optimisation. These cases are in addition to an MAG rejecting the establishment of a new routing optimisation path or rejecting a refresh of it as described in earlier sections. In any of these cases the need to remove route optimisation will be known to an LMA. In order to remove the route optimisation, ROU messages can be sent to the MAG(s) affected by the removal with the lifetime or some other field set to zero to indicate the removal. Each LMA serving the MAG(s) also remove the corresponding entry from their LROT. Route optimisation according to all disclosed embodiments can be governed by policies. The policies would dictate if route optimisation were to be applied or not for a certain traffic exchange. The possibility to disable route optimisation would be desirable if the LMA needs to observe the traffic of a user, e.g., for legal intercept or for charging reasons. Policies can be applied at three different levels of granularity.

As a first option, the MAGs and/or LMAs may have polices that prohibit or enable an MN to participate in route optimisation. In this option the entire traffic of the MN is subject to one decision. If the MAG has a prohibitive policy, it can reject the establishment of route optimisation as described in the previous embodiments. If the LMA has such a prohibiting policy then it simply abstains from initiating route optimisation. Likewise if the policy is allowing, the establishment will be accepted.

As a second option, MAGs and/or LMAs may have policies for an MN that prohibit or allow route optimisation towards certain other MNs identified by their address (or subscriber ID) or MAGs. In this case a decision is made for route optimisation for each MN-MN pair. For example, an MAG can decide that an MN is allowed to perform route optimisation with a first MN but not with a second MN due to certain reasons. The decision can be enforced similar to the first option.

As a third option, MAGs and/or LMAs may have policies that prohibit route optimisation for certain flows of an MN only. In general a flow is a set of packets all matching a filter criteria, e.g., five tuple or a bunch of five tuples. A flow can typically be a media component (voice or video stream), a download or packets of a gaming session. For example flows using a certain set of ports (e.g. voice) shall not be route optimized for intercept purposes. In this case route optimisation shall be set up in the same way as in the previous embodiments. However, the ROU messages shall be extended with IP flow information in order to configure MAGs to selectively route packets to the peer MAG or to the LMA. As an example, in a session performing route optimisation the packets will in general be sent directly via the involved MAGs, however all voice packets will be routed via an LMA.

It should also be noted that policies can be applied in the same fashion in case the MAGs are located below different LMAs.

Although PMIP is developed as a local mobility management protocol, it can be applied in a global mobility setting. It should also be understood that the present approach is also applicable in that context.

Networks may employ polices to prevent route optimisation between non-cooperating networks (when the MAGs are in different visited networks). Also, the non-co-located case is applicable, with the LMAs signalling to each other if agreements permit such signalling.

It should also be understood that the present approach is applicable to any network-based mobility protocol, most notably GTP (GPRS Tunnelling Protocol), 3GPP 29.060. It is also applicable to other variants of PMIP, most notably PMIPv4, IETF draft-leung-mip4-proxy-mode-00.txt. Even though some modifications will be needed for GTP due to Quality of Service handling, the information is similar. Of course, some additional fields may be needed for messages, but those can be added by someone skilled in art.

Figure 7:
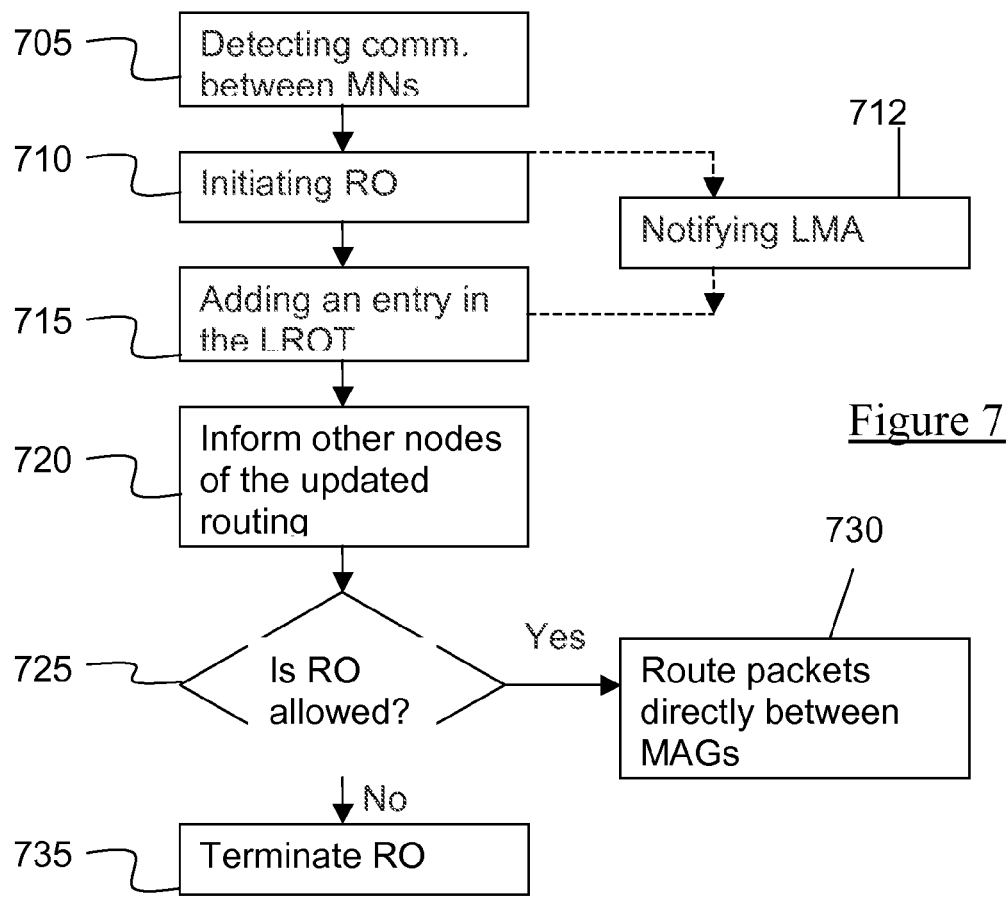
FIG. 7 is a flowchart illustrating a method of initiating route optimisation according to the invention.

FIG. 7 is a flowchart illustrating a method of initiating route optimisation. Note that this flowchart only describes the method according to the three described embodiments. The handover procedure is e.g. not described and is described below with reference to FIG. 7b. The method is initiated upon indication in step 705 that two MNs located in the same administrative domain communicate with each other. The detection is either performed in an LMA or in an MAG. Next, a decision is made to initiate route optimisation for the traffic in step 710. The decision is preferably performed in an LMA, but it could also be done in an MAG. In case both of the steps 705-710 is performed in an MAG, the LMA will be notified of the detection and the decision in step 712. In case only the step 705 was performed in an MAG, the LMA will be notified prior to the step 710. After route optimisation is decided, an optimized route for the traffic is created in step 715 whereby an entry is added in the LROT. In this route the traffic is routed directly between the two MAGs serving the two MNs. In step 720 all involved nodes are informed of the new route in an ROU message and will update their routing tables accordingly. If only one LMA is involved in the traffic and the LMA does the initiation, it will send the ROU message to the MAGs involved in the traffic. If two LMAs are involved and an LMA does the initiation, the initiating LMA will send the ROU message to the other LMA and the MAG served by the initiating LMA; the other LMA will forward the ROU message to its MAG involved in the traffic. If a MAG does the initiation it will send the ROU message to the LMA that serves the MAG, which LMA will forward the ROU message to any uninformed MAG, either directly or indirectly via an LMA.

In some circumstances policy settings are applied, deciding whether to allow or reject route optimisation in different cases. If it is decided in step 725, according to an alternative "Yes", that route optimisation is allowed for the traffic or for certain flows or packets in the traffic then the traffic or the packets are routed directly between the MAGs serving the MNs, see step 730. If route optimisation for some reason is rejected, alternative "No", the route optimisation is terminated for certain packets or for the entire traffic, or it is simply not realized, see step 735. The step 725 could of course also be performed before the other nodes are informed of the updated routing in step 720.

Figure 7B:
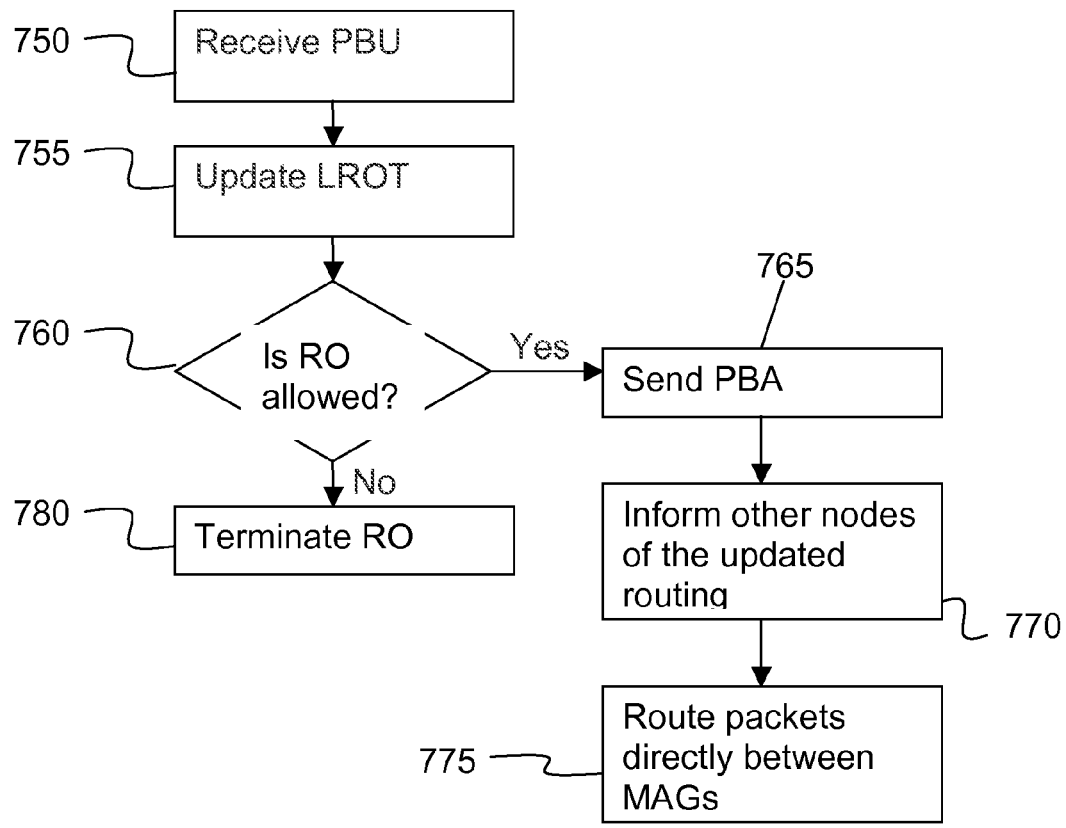
FIG. 7b is a flowchart illustrating a procedure for performing handover in a route optimized session.

FIG. 7b is a flowchart illustrating a procedure for performing handover in a route optimized session. The flowchart is seen from the perspective of an LMA. First in step 750, the LMA receives a proxy binding update from the MAG experiencing the attachment of an MN. In step 755 the LMA updates its LROT in accordance with the new information and controls in step 760 whether route optimisation is allowed for the new combination of MAGs and MNs. If the answer is "yes" then a proxy binding acknowledgement is sent back to the MAG. In step 770 all involved nodes are informed of the new route in an ROU message and will update their routing tables accordingly. Thereafter the traffic will be directed between the MAGs of the MNs involved in the communication without routing via an LMA. If the answer in step 760 is "no", route optimisation is terminated in step 780.

Figure 8:
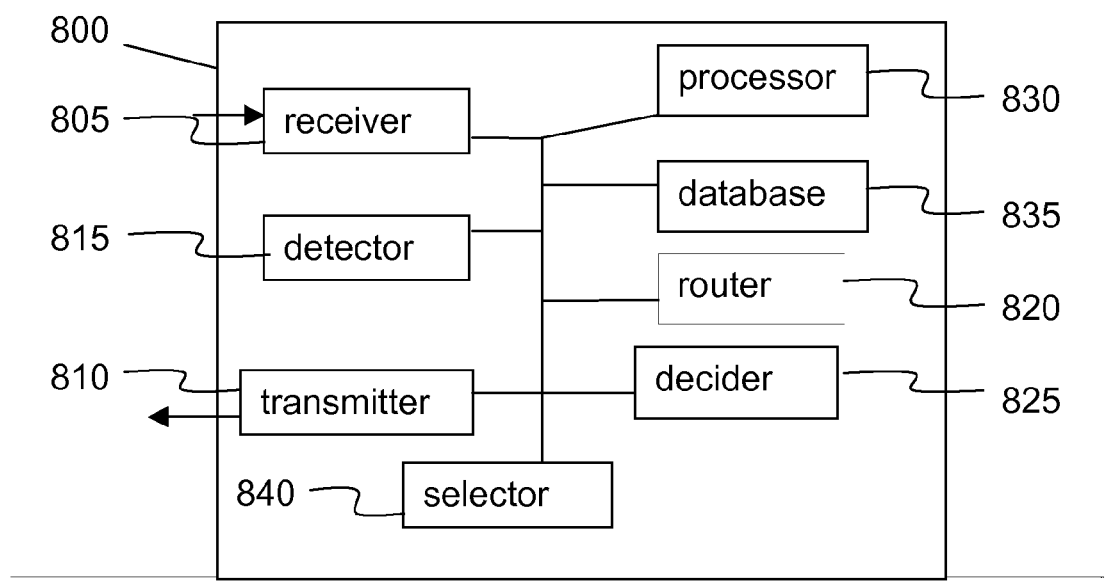
FIG. 8 illustrates a schematic block with the components of initiating route optimisation according to the invention.

FIG. 8 illustrates schematically the components of a node 800 for handling route optimisation according to an embodiment of the invention. The components are in this case implemented in a single box, however they can of course be implemented in many separate boxes. The node 800 can be a Mobility (also called Mobile) Access Gateway (MAG) or a Local Mobility Anchor (LMA) and it comprises a receiver 805 and a transmitter 810 for receiving and transmitting IP packets. The components to be further described in the following must not necessarily be included in one single node, but some of the components can be in an LMA and some in an MAG. The important thing is that an LMA-MAG pair contains the necessary components to initiate route optimisation in case of traffic exchange between two mobile nodes within the domain. Some of the components that are shown as separate entities can of course be merged into other entities. The node further comprises a detector 815 for detecting traffic exchange between mobile nodes within the administrative domain in which the node is located. The node comprises a router 820 for routing IP packets to other nodes. Separate routers can be used for the downlink packets and the uplink packets.

In the Mobile Internet Protocol the router is referred to as a mobility agent. Further, the node is provided with a decider 825 for making the decision whether to initiate route optimisation or not. The node is preferably provided with a processor 830 or similar for establishing traffic exchange between mobile nodes within the administrative domain based on information received from the detector 815 or the receiver 805. The processor 830 is preferably also arranged in order to create an optimized route for the traffic, in which the traffic is routed directly between MAGs. The creation of the optimized route is based on the mobile nodes involved in the detected traffic exchange. A database 835 is preferably included comprising a list of policy settings regarding route optimisation, i.e. different criteria based on which route optimisation is initiated, maintained or terminated. The node is preferably provided with a selector 840 for selecting which packets that shall be route optimized and which shall not, e.g. if certain packets in a communication session shall be routed over the LMA instead of directly via the MAGs for e.g. security reasons.

System Architecture Evolution (SAE) is the core network architecture of 3GPP's future Long Term Evolution (LTE) wireless communication standard. SAE is the evolution of the GPRS Core Network. One of the features of SAE is that it transfers control of the radio interface from the Radio Network Controller (RNC) to the NodeBs of the radio access network. These enhanced NodeBs are known as "eNBs". In SAE technology, the SGSN is known as the "Serving Gateway" (SGW) whilst the GGSN is known as the "Packet Data Network Gateway" (PDN GW). Assuming PMIP terminology, the eNB represents a MAG towards the SGW. The SGW acts as an LMA towards the eNB and as a MAG towards the PDN GW, whilst the PDN GW acts as a LMA towards the SGW. Thus SAE introduces a multi-layer mobility architecture with at least two anchor points for each mobile terminal.

The application of the route optimisation approach described above to a multi-layer mobility architecture will be described later in the context of SAE. However, it is illustrative to first describe the approach in terms of a generic multi-layer architecture assuming the PMIP terminology.

Figure 9:
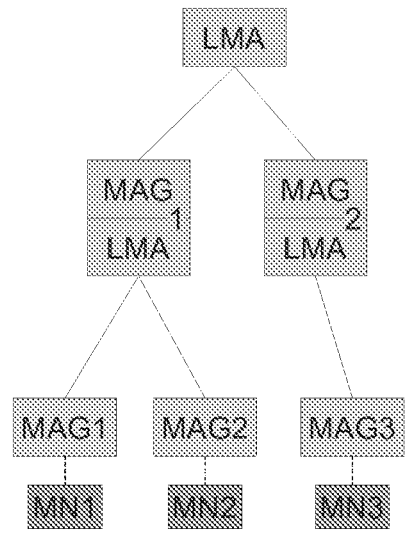
FIG. 9 illustrates schematically a hierarchical PMIP architecture including three Mobile Nodes attached to respective MAGs at the same level.

FIG. 9 shows a hierarchical PMIP architecture, where a MAGLMA1 node acts as a MAG towards the LMA node and as an LMA towards MAG1 and MAG2. The former relation is termed the "upper" PMIP session and the latter is termed the "lower" PMIP session hereinafter. The starting point for implementing route optimisation in this architecture is to apply the approach described above (FIGS. 1 to 8) to the upper PMIP session. For MN1-MN2 communication, this will result in the LMA instructing MAGLMA1 that these two specific UEs are in direct communication with each other, enabling MAGLMA1 in turn to direct MAG1 and MAG2 to establish direct communication for this MN pair.

Considering a relation between MN1 and MN3 (where the two MNs are not served by the same MAGLMA node), applying the route optimisation approach to the upper PMIP session will result in the LMA informing each MAGLMA of the identity of the other MAGLMA which in turn may direct MAG1 and MAG3 to establish direct communication. As described above, even in the case where the two communicating MNs are served by different top-level LMAs, it may be possible to enable direct communication between the lower level MAGs.

It is noted that the LMA may be unaware that there are multiple levels of hierarchies present, with this being known and handled entirely by the middle level: that is the MAGLMAs and to some extent the MAGs.

Figure 10:
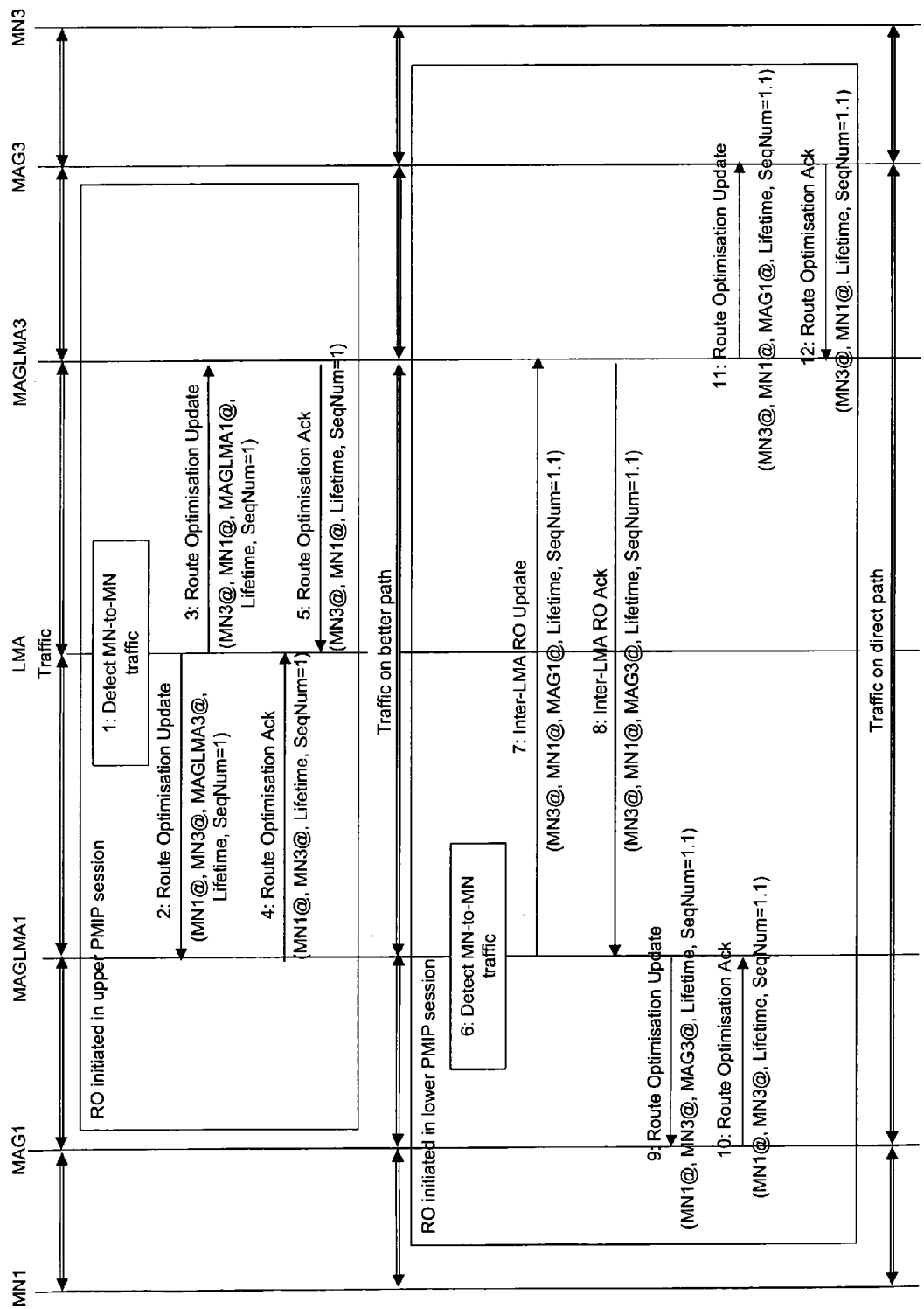
FIG. 10 illustrates a signalling flow associated with route optimisation in the architecture of FIG. 9.

Signalling associated with the route optimisation process applied to the architecture of FIG. 9 for the MN1-MN3 case, is illustrated in FIG. 10. The process starts with the LMA detecting MN-to-MN user plane traffic flowing through it (step 1). The LMA detects this for example by observing that it owns both the source and destination addresses of IP packets. The LMA instructs MAGLMA1 and MAGLMA2 to implement route optimisations (steps 2 to 5). At this stage, traffic is being routed directly between MAGLMA1 and MAGLMA2.

One of the MAGLMA entities, MAGLMA1 in the example of FIG. 10 detects in its LMA capacity that there is now MN-to-MN traffic passing through it (step 6). MAGLMA1 initiates inter-LMA route optimisation (step 7). MAGLMA3 responds (step 8) with the MAG address of MN3 (the third attribute in the message at step 8) and then both MAGLMAs establish the route optimisation state in the lower PMIP sessions (steps 9 to 12). Of course, rather than having to wait to detect user plane traffic before initiating route optimisation at the lower level, one of the MAGLMAs may initiate this upon receipt of the route optimisation update from the LMA.

It is possible that both MAGLMAs initiate route optimisation at the same time. However, this is easy to detect and handle (e.g. both sides acknowledge the message and use the combined new information as discussed above). Nevertheless, it is desirable to avoid such occurrences as much as possible. To this end, the MAGLMA that handles the MN with the lower ordinal IP address should apply a random delay before initiating route optimisation towards the other MAGLMA.

Considering further the lower level route optimisation procedure, as indicated in FIG. 10, the sequence numbers are augmented at this level with a second value, i.e. having the form "n.n". [The sequence number indicated in the ongoing session is set to 1.1.] The first part of the sequence number is that of the current sequence number in the upper PMIP session. The second part is specific to route optimisation in the lower PMIP session. If one of the MNs is handed over from one MAG to another, but the MAGLMAs remain the same (no change in the upper PMIP session), the first part of the sequence number remains unchanged and only the second part is incremented. If, however, the identity of one of the MAGLMAs is changed and the sequence number of the upper PMIP session is incremented, the second part of the lower PMIP session sequence number can be restarted at 1. When comparing such compound sequence numbers (for example to resolve a conflict arising as a result of a delayed or re-sent route optimisation update), a sequence number with a higher first part is always higher. The compound sequence number is needed in order to flag-up handovers at the upper PMIP session, in the lower PMIP session.

The lifetime values in the lower PMIP session shall be always set to expire earlier than in the upper PMIP session. In practice, lifetime values are periodically refreshed in the MAGLMAs by the LMA, and in turn by the MAGLMAs in the MAGs. This is to avoid a situation where the LMA assumes that route optimisation for a session has expired, when in fact it is continuing at the lower level.

Continuing with a consideration of the generic PMIP case, various handover scenarios will now be considered.

Handover Between two MAGs Below the Same MAGLMA

Figure 11:
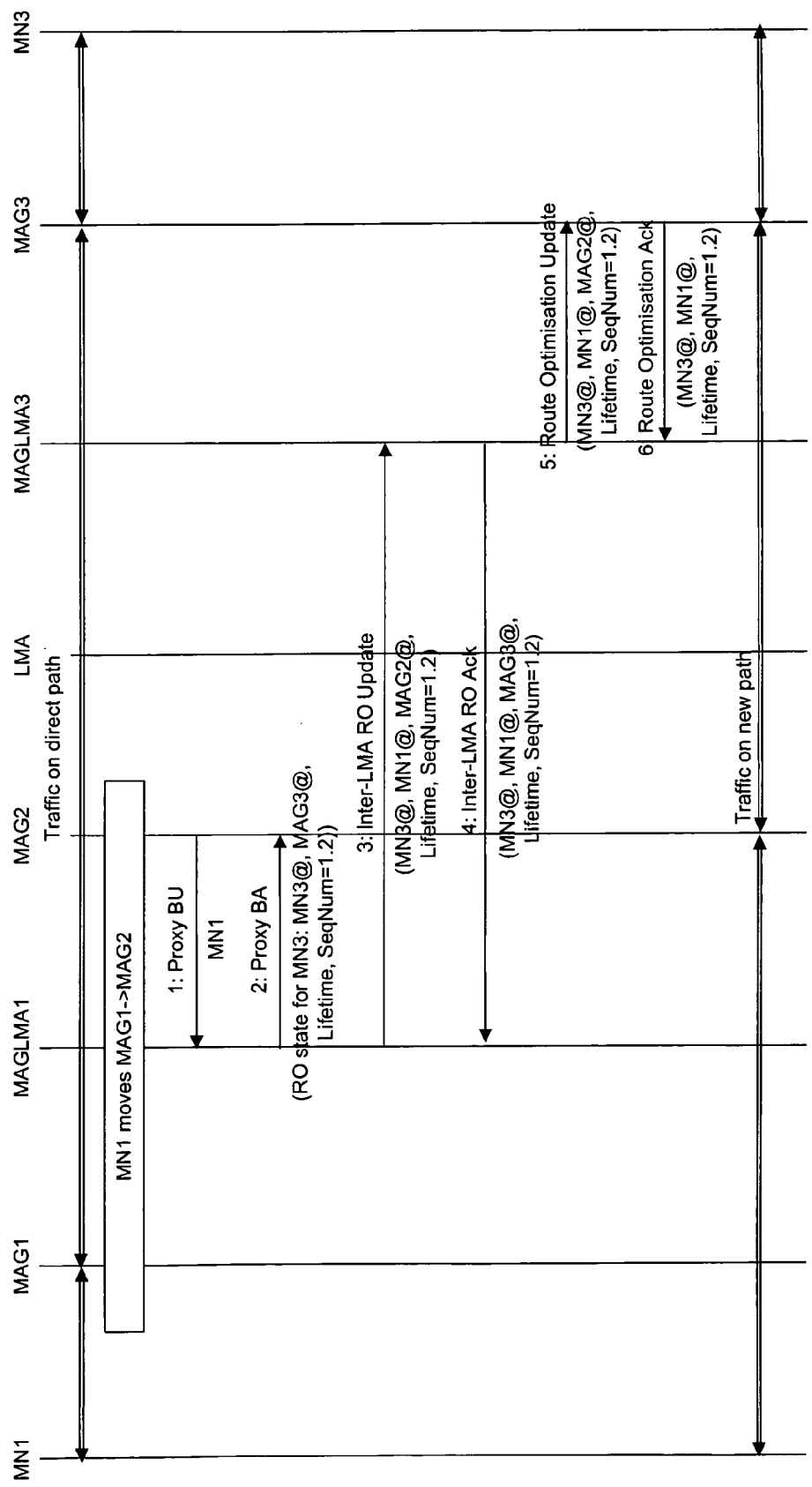
FIG. 11 illustrates a signalling flow associated with route optimisation in a PMIP architecture where handover is performed by a Mobile Node between MAGs located below the same MAGLMA.

FIG. 11 illustrates signalling associated with this scenario, assuming that MN1 is handed over from MAG1 to MAG2, both of which connect to MAGLMA1.

The process starts with the new MAG sending a PBU (step 1) to MAGLMA1. In the PBA (step 2) the MAGLMA1 also includes all route optimisation state information that exists for MN1. In our example there is only one other MN for which route optimisation is in progress, namely MN3. Then, MAGLMA1 informs the other MAGLMA3 about the change in the location of MN1 (steps 3 and 4). Finally, MAGLMA3 updates the route optimisation state information in MAG3 (steps 5 and 6).

It will be observed that MAGLMA1 updates the second part of the sequence number in response to the handover, it becomes 1.2, indicating that the handover has been performed at the lower layer but that no handover has been performed at the upper layer.

Handover Between MAGLMAs

Figure 12:
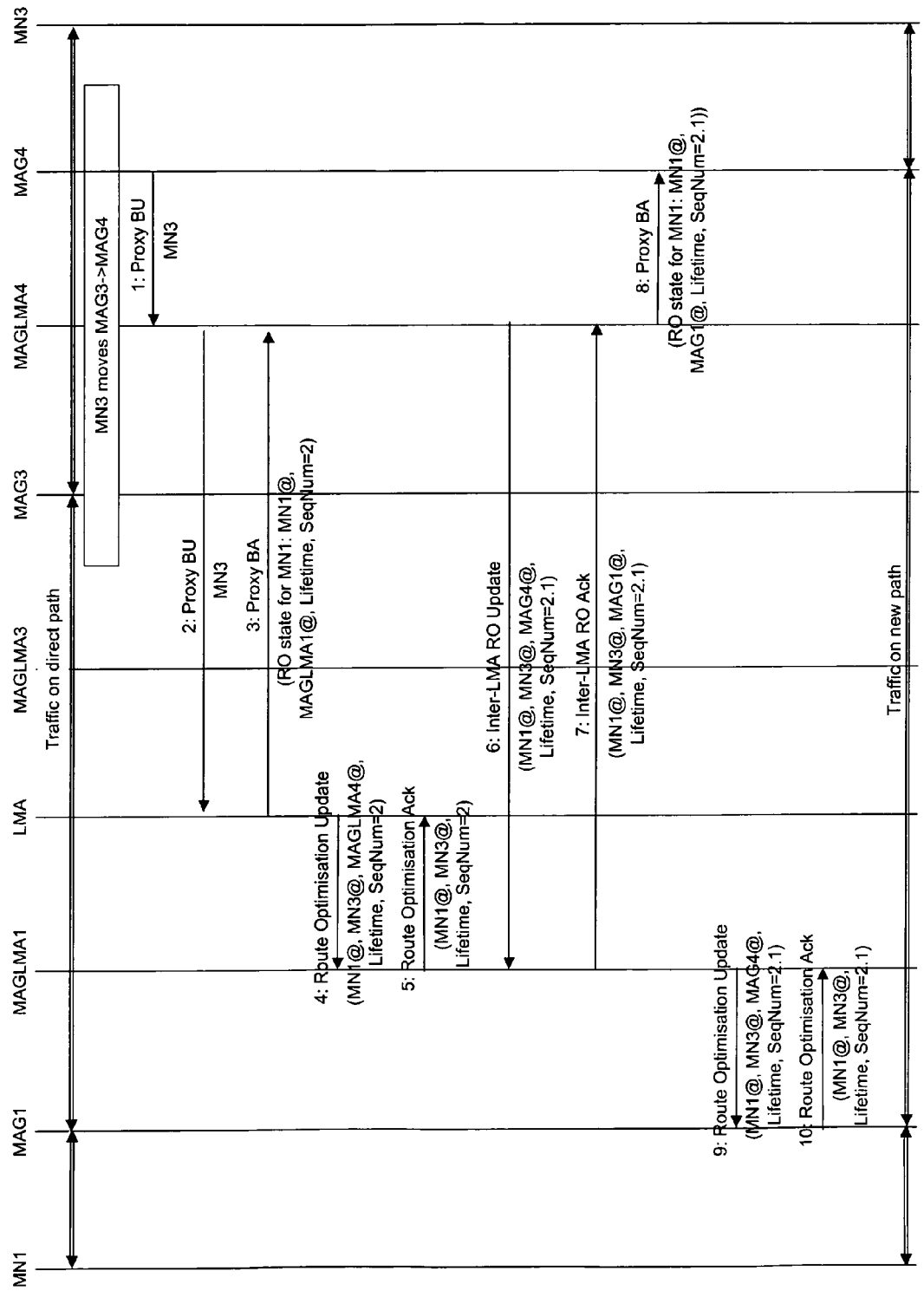
FIG. 12 illustrates a signalling flow associated with route optimisation in a PMIP architecture in which handover of a performed by a Mobile Node between two MAGs located below different MAGLMAs.

This is a more complicated scenario in which the handover of a MN also changes the MAGLMA. FIG. 12 illustrates signalling associated with the case where MN3 moves from MAG3 (connected to MAGLMA3) to MAG4 (connected to MAGLMA4).

The process starts by MAG4 sending a PBU to MAGLMA4 (step 1) and MAGLMA4 in turn sending a PBU to LMA (step 2). Of course, at this point, neither MAG4 nor MAGLMA4 are aware that route optimisation is in progress. The LMA responds to the MAGLMA4 with route optimisation state information regarding MN3 (steps 3 and 4), that is the route optimisation maintained towards MN1. The LMA also updates the information at MAGLMA1 (steps 4 to 5). Then the two MAGLMA make contact with one another (initiated by MAGLMA4 in the example of FIG. 12) and exchange information about the MAGs serving the two MNs (steps 6 and 7). As a result MAGLAM4 can respond to MAG4 with route optimisation state information (step 8), whilst MAGLMA1 can update route optimisation state information in MAGI (steps 9 to 10). Note that in the signalling of FIG. 12, the second part of sequence number has been restarted after the increase in the first part, making the compound sequence number "2.1."

Unbalanced PMIP Hierarchies

Figure 13:
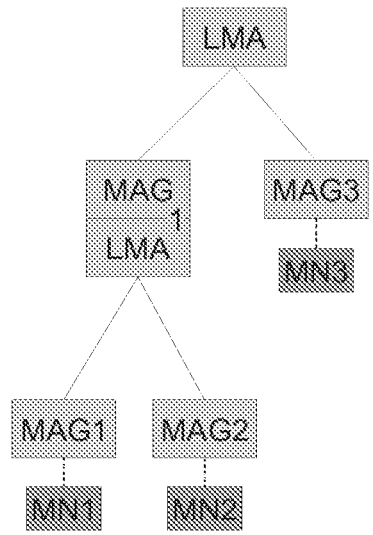
FIG. 13 illustrates schematically a PMIP architecture in which Mobile Nodes are attached to MAGs at different layers in the hierarchy.

It is possible that one of the MAGLMAs is in fact only a MAG, i.e. there is no PMIP hierarchy below it. FIG. 13 illustrates such a scenario, where MN3 is connected to MAG3 which in turn is directly connected to LMA. In this scenario, MAG3 may receive Inter-LMA route optimisation messages. MAG3 can reject such messages, in which case route optimisation will only happen in the upper PMIP session, i.e. traffic will only be routed between MAGLMA1 and MAG3. Alternatively it can also respond to the Inter-LMA route optimisation messages by specifying itself as the MAG serving the MN (MN3 on the Figure), in which case route optimisation will be between, for example, MAG1 and MAG3 for MN1 and MN3 traffic.

Note that signaling only takes place between entities at the same level (MAGLMA1-to-MAG3) or between parent-sibling relations (MAGLMA1-to-MAG2), but not between MAGs, e.g., MAG3 and MAG2. This simplifies the procedures required for securing messages.

Multiple External Networks

In 3GPP the concept of external Packet Data Networks exists. Such PDNs connect upwards from the LMAs and represent various corporate networks served by the core network or the service network of the operator or indeed the Internet itself. Terminals can select an external PDN to connect to when attaching (or creating a primary PDP context), by specifying an Access Point Name (APN) corresponding to the external PDN desired. This parameter is then transmitted in PBU messages.

Each PDN can have its own IP addressing plan and the use of private IP addresses is permitted. This means that two MNs may have the same IP address albeit in different PDNs. Also, when nodes (e.g., the LMA) decide to initiate route optimisation between MN1 and MN2 based on an observation that MN1 sends a packet to MN2's IP address, the node must also check whether or not the two MNs are connected to the same external PDN. This is a function necessary in the LMA.

In the case of multiple LMAs, the LMAs must be configured with the IP address ranges of other LMAs on a per PDN basis. Thus when an LMA seeks to determine whether or not a destination is served by another LMA, it should consider those LMAs and address ranges that are assigned to the same PDN.

Once the LMA has decided on route optimisation, it is known to other nodes that the two MNs are connected to the same PDN.

If this invention is applied to a system supporting multiple PDNs, then each MN IP address in a route optimisation message must be accompanied with the globally unique APN of the MN in order to unambiguously identify a MN.

It will be appreciated that whilst the hierarchical route optimisation approach has been described above with reference to a single LMA, the approach is equally applicable to the case where two MNs are anchored at different, but co-operating LMAs. In such a case, appropriate signalling is exchanged between the LMAs to inform both nodes that route optimisation at the upper layer (e.g. MAGLMA) is possible.

It will also be appreciated that the approach is applicable to hierarchies of more than two levels. In such cases, the compound sequence number will consist of n tags at the nth level. If MAGs and MAGLMAs are prepared for this, then there is no specific handling needed in order to add another level. In theory at least, this means that the approach can be implemented in a "global" PMIP scenario.

It is noted that all policy related extensions may apply for hierarchical route optimisation, essentially as discussed above in respect of the non-hierarchical approach. Of course, it is possible to have policies regarding route optimisation on a per level basis, e.g. to enable route optimisation on one level and prohibit it on another. This may be applicable, for example, if legal intercept or accounting functions are not present at MAGs, but only in the MAGLMAs.

The following discussion further details the application of the hierarchical approach in the context of a 3GPP SAE network. In particular, consideration is given to the handling of the GTP at the lower level. This corresponds to the IETF oriented SAE core network described by 3GPP TS 23.402. Consideration will then be given to the case where GTP is employed at both levels, corresponding to the GTP-based core network described by 3GPP TS 23.401.

Figure 14:
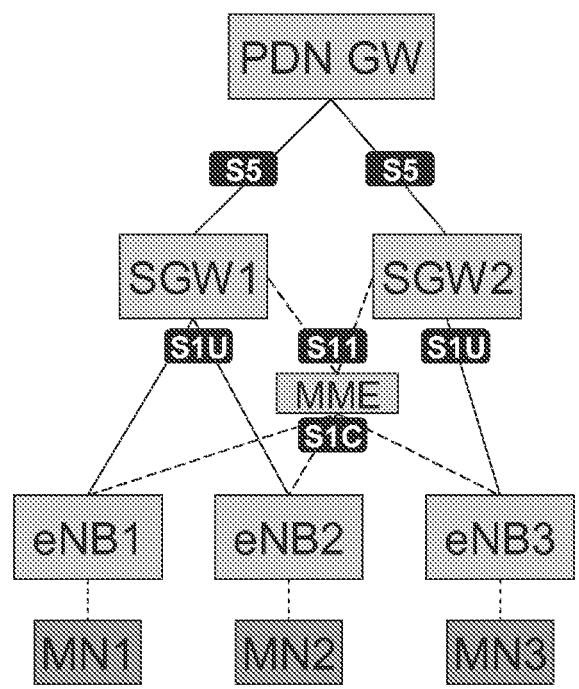
FIG. 14 illustrates schematically a GTP architecture in which the described route optimisation procedure can be employed.

As already discussed, the PMIP LMA corresponds to the SAE PDN GW, the MAGLMA to the Serving GW (SGW), and the MAGs to the eNBs. Between eNBs and SGWs the GTP protocol is implemented, not PMIP. A further complexity is that in the SAE architecture, signaling between the eNB and the SGW transits a Mobility Management Entity (MME). This architecture is illustrated in FIG. 14. In a real deployment, one MME will probably control a number of eNBs and SGWs, but the Figures show only one MME for simplicity. 3GPP also specifies interface names that are depicted in the Figure. Note that S1C and S11 are signaling only, S1U is user plane only, while S5 is both signalling and user plane. In TS 23.402 S5 runs PMIP, in TS 23.401 S5 runs GTP.

The most significant difference between GTP and PMIP is that PMIP covers only mobility, while GTP can also establish QoS state (call bearers). Each GTP user data packet carries a value that identifies which bearer the packet belongs to. This is called the Tunnel Endpoint Identifier (TEID) and its actual value is selected by the entity terminating the GTP tunnel and is communicated to the tunnel ingress point at bearer setup and handover. Usually a new bearer to the same terminal is established when different QoS treatment is needed.

In GTP, the TEID value is important and route optimisation must take this into account. In particular, for each MN there is a downlink filter set installed by the MME in the SGW that specifies which of the downlink packets to put to which of the bearers. The bearers are identified by the TEID selected by the eNB, thus the table contains <IP flows descriptor to TEID> mappings.

Considering the TS 23.402 case (PMIP+GTP), the most important difference compared to the PMIP+PMIP case is that the SGW does not send Route Optimisation Update messages directly to the eNBs, but rather does this via the MME. If the same MME serves both eNB (or MN) then a single message suffices: if not, then the regular two message signaling happens. The MME passes these messages to the eNBs. It is also possible that Inter-LMA route optimisation messages exchanged between SGWs are not exchanged directly, but rather transit the MME.

A second, significant difference over the PMIP+PMIP case is that bearers must be taken into account when establishing route optimisation. This can be done in the MME. The basic requirement is that if a certain packet flow is mapped to a bearer with a certain QoS then it must be transmitted using that QoS and must be tagged with the right TEID in the sending eNB. This ensures that the receiving eNB knows which MN it is and which radio bearer to put the packet on. There are two ways to achieve this.

Assume that route optimisation is established between MN1 and MN3 located at eNB1 and eNB3, respectively. A first solution involves bearer selection in the sender eNB. If the MME has decided that traffic from MN1 to MN3 can be route optimized, it can download the entire downlink filter set of MN3 to eNB1 (or at least those filter rules which may match traffic between MN1 and MN3). In parallel, the downlink filters of MN1 are downloaded to eNB3. Such filter sets describes how downlink traffic (IP addresses, port numbers) is mapped to bearers (TEIDs). This enables eNB1 to select the correct TEID for each packet in exactly the same way as the SGW would select for downlink packets. This way the receiving eNB will see exactly the same TEID as without route optimisation.

A variation of this solution is that the MME only selectively performs route optimisation for only some bearers or flows. In this case the downloaded filter set can be extended with rules defining whether or not to perform route optimisation.

According to this first solution, the Route Optimisation Update messages will not only contain the other eNB address, but also a set of IP flow filters with associated TEID.

A second solution involves bearer selection in the receiver eNB. It is also possible to download the downlink filter set of MN3 to eNB3. In this case, it is the task of eNB3 to map the incoming route optimisation packets to the correct bearer. The route optimisation message also contains a set of IP flow filters with associated radio bearer IDs.

According to the first solution, packets are transmitted in the transport network between the two eNBs using the QoS class they enjoy in the receiver airlink. According to the second solution, the packets take their transport QoS from the QoS class of the sender airlink. In both cases, the eNBs will need to perform flow classification, which will represent a new function for the eNB.

It is further noted that any inter-LMA route optimisation messages, and not only route optimisation Update messages, must contain the filter sets as indicated above.

When route optimisation is to be applied to a bearer which can only carry traffic between two MNs (e.g., a single VoIP bearer), it may be possible to avoid flow classification or IP observation in the eNB. In such cases the full traffic of the bearer is route optimized to exactly one eNB. In this case the route optimisation Update messages sent by the MME do not contain the IP address of the other MN, but identify the radio bearer of the sending MN. They also contain a single TEID to be applied when encapsulating towards the other eNB.

Considering further application of the hierarchical approach to TS 23.401 (GTP+GTP), in this case also the upper mobility session employs GTP. The upper mobility session has no node similar to the MME, with signaling messages being exchanged directly between the SGW and PDN GW. As such, only the selection of the appropriate TEID is needed to be considered of the two differences mentioned for the lower mobility session in the preceding section.

However, in other aspects the solution is similar to the PMIP+GTP architecture. When the PDN GW sends route optimisation Update messages to the SGWs it must specify the downlink filters of the other or same MN according to the two cases in the previous section.

The hierarchical approach to route optimisation described above allows the routing of packets in the shortest possible path between MAGs for two MNs both using PMIP as mobility management protocol even in a hierarchical setting. This saves transmission bandwidth for operators and, at the same time, reduces latency. The method may be totally transparent to MNs, being entirely network centric. Its use can be governed by polices and is capable of applying route optimisation to only a subset of the traffic. The method can works seamlessly with non-MN-to-MN traffic.

As discussed, the approach can also work in a SAE network to fully optimise traffic between eNBs. The method can work with all inter-terminal traffic at a global or near global level, if all LMAs are configured properly, although in practice operator limitations are likely to restrict the scope of application.

The invention claimed is:

1. A method of handling route optimization in a communication network for traffic being exchanged between a first mobile node and a second mobile node, wherein the first mobile node is attached to a first access point and the second mobile node is attached to a second access point, and wherein the first access point is attached to a first anchor point and the second access point is attached to a second anchor point, the method comprising:
    at the first anchor point and the second anchor point, initially handling a flow of traffic through the first anchor point and the second anchor point between the first mobile node and the second mobile node;
    at the first anchor point, making a decision based upon the flow of traffic to initiated route optimization for the flow of traffic and initiating route optimization by sending a route optimization update to the first access point and the second access point, the route optimization update comprising a sequence number; and
    upon receipt of the route optimization update at the first access point and the second access point, acting on the route optimization update to establish an optimized traffic route, wherein a flow of traffic in the optimized traffic route does not flow up to the first anchor point and the second anchor point;
    wherein,
        in response to the first mobile node performing a handover from the first access point to a third access point, the first anchor point
            increments the sequence number to generate an incremented sequence number,
            sends a further route optimization update comprising the incremented sequence number to the second access point, and
            upon receipt of the further route optimization update at the second access point, determining if the incremented sequence number included in the further route optimization update is larger than a sequence number included in any previously-received route optimization update and, if so, acting on the further route optimization update to establish a further optimized traffic route involving the third access point.

2. The method according to claim 1, wherein the step of establishing
an optimized traffic route further comprises:
establishing a direct traffic route between the first access point and the second access point.

3. The method according to claim 1, wherein the first access point, second access point, first anchor point, and second anchor point are all located within a same administrative domain.

4. The method according to claim 1, further comprising:
observing an Internet Protocol (IP) addresses of packets within the flow of traffic establishing that both a source IP address and a destination IP address for packets belong to mobile nodes being served by the same administrative domain and in response to deciding to initiate route optimization.

5. The method according to claim 4, wherein the steps of observing and establishing are carried out at the first anchor point.

6. The method according to claim 1, further comprising:
deciding to initiate route optimization at the first anchor point in response to receipt at the first anchor point of a notification, from the first access point.

7. The method according to claim 6, wherein the steps of observing and establishing being carried out at the first access point and said notification is sent to the first anchor point.

8. The method according to claim 1, further comprising:
including Internet Protocol (IP) flow information within the route optimization update and using the IP flow information to establish the optimized traffic route.

9. The method according to claim 1, further comprising:
adding an entry into a route optimization table in the first access point and the second access point, the entry comprising at least Internet Protocol (IP) addresses of the first access point, the second access point, the first mobile node, and the second mobile node.

10. The method according to claim 1, wherein the route optimization update comprises an expiry time for the route optimization.

11. The method according to claim 1, further comprising:
intermittently, re-sending the route optimization update to the first access point and the second access point after optimized traffic route has been established.

12. The method according to claim 1, wherein when the first mobile node performs the handover from the first access point to the third access point, the method further comprises:
receiving a proxy binding update at the first anchor point from the third access point;
updating the optimized traffic route to involve the third access point instead of the first access point;
sending a proxy binding acknowledgement to the third access point;
sending the further route optimization update, directly or indirectly, to the second access point; and
routing the flow of traffic directly between the third access point and the second access point.

13. The method according to claim 12, wherein the proxy binding acknowledgement is extended with the further route optimization update.

14. The method according to claim 1, wherein the first access point is attached to the first anchor point and the second access point is attached to the second anchor point, the method further comprising:
sending a route optimization update from the first anchor point that either initiated route optimization or serves the first access point that initiated route optimization, to the second anchor point; and
at the second anchor point, forwarding the route optimization update to any other access point that has not received the route optimization update.

15. The method according to claim 1, wherein the communication network employs Proxy Mobile IP, the first anchor point being a Local Mobility Anchor and the first access point being a Mobile Access Gateway.

16. The method according to claim 1, wherein the communication network employs General Packet Radio Service (GPRS) Tunneling, the first anchor point being a GPRS Gateway Support Node (GGSN) and the first access point being a Serving Gateway Support Node (SGSN).

17. The method according to claim 1, wherein the first access point also acts as a first lower level anchor point for a first lower level access point in a hierarchical architecture, with a third mobile node being attached to the first lower level anchor point via the first lower level access point.

18. The method according to claim 17, wherein the step of establishing the optimized traffic route comprising:
upon receipt of a route optimization update at the first lower level anchor point, sending a route optimization update from the first lower level anchor point to the first lower level access point, and
establishing an optimized traffic route wherein the traffic does not flow up to the first lower level anchor point.

19. The method according to claim 18, wherein the optimized traffic route wherein the traffic does not flow up to the first lower level anchor point is a direct route between the first lower level access point and a second lower level access point.

20. The method according to claim 17, wherein the communication network employs the GPRS Tunneling Protocol, wherein the first anchor point being a GPRS Gateway Support Node (GGSN), the first lower level anchor point being a Serving Gateway Support Node (SSGN), and the first lower level access point being an enhanced Node B (eNode B).

21. The method according to claim 17, wherein in the event that the third mobile node performs a handover from the first lower level access point to a third lower level access point, the method further comprising:
receiving, a proxy binding update at the first lower level anchor point from the third lower level access point;
sending a proxy binding update from the first lower level anchor point to the first anchor point;
sending a proxy binding acknowledgement to the first lower level anchor point;
updating the optimized traffic route to involve the third lower level access point instead of the first lower level access point;
sending a proxy binding acknowledgment to the first lower level access point;
sending a route optimization update, directly or indirectly, to the third lower level access point; and
routing traffic directly between the third lower level access point and a second first lower level access point.

22. An anchor point for use in a communication network in which traffic is to be exchanged between a first mobile node and a second mobile node, wherein the first mobile node is attached to a first access point and the second mobile node is attached to a second access point, and the first access point and the second access point are attached to the anchor point, the anchor point comprising:
- a processor for initially handling a flow of traffic through the anchor node between the first mobile node and the second mobile node;
- a processor for making a decision based upon the flow of traffic to initiate route optimization for the flow of traffic and for initiating route optimization by sending a route optimization update to the first access point and the second access point, wherein the route optimization update comprises a sequence number, and upon receipt of a proxy binding update for the first mobile node from a third access point, increment the sequence number to generate an incremented sequence number and send a further route optimization update containing the incremented sequence number to the second access point, update an optimized route to involve the third access point instead of the first access point, upon a determination by the second access point, that the incremented sequence number is larger than a sequence number included in any previous route optimization update.

23. The anchor point node according to claim 22, wherein the processor for making a decision based upon the flow of traffic is further configured to observe Internet Protocol (IP) addresses of packets being processed by the anchor point node, to compare observed IP addresses with IP address ranges belonging to the anchor point node and to initiate route optimization in an event of a match being found.

24. An access point node for use in a communication network in which traffic is to be exchanged between a first mobile node and a second mobile node, wherein the first mobile node is attached to the access point node and the second mobile node is attached to a further access point node, the access point node and the further access point node being attached to an anchor point node, the access point node comprising:
- a receiver for receiving a route optimization update from the anchor point node, the route optimization update comprising a sequence number;
- a processor for acting on the route optimization update to establish an optimized traffic route wherein traffic does not flow up to the anchor point, and upon receipt of a further route optimization update comprising an incremented sequence number that was generated by the anchor point upon receipt of a proxy binding update for the first mobile node from a new access point, updating the optimized traffic route to involve the new access point instead of the further access point, and determining if the incremented sequence number in the further route optimization update is larger than a sequence number included in any previously received route optimization update and, if so, acting on that further optimization update to establish an optimized traffic route involving the new access point.

25. The access point node according to claim 23, further comprising:
- a processor for selecting which packets shall be route optimized and which packets shall not be route optimized.

* * * * *